(12) United States Patent
Sinha

(10) Patent No.: US 8,231,707 B2
(45) Date of Patent: Jul. 31, 2012

(54) GAS SEPARATION USING ULTRASOUND AND LIGHT ABSORPTION

(75) Inventor: Dipen N. Sinha, Los Alamos, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 952 days.

(21) Appl. No.: 12/242,185

(22) Filed: Sep. 30, 2008

(65) Prior Publication Data

US 2010/0077919 A1    Apr. 1, 2010

(51) Int. Cl.
*B01D 51/08* (2006.01)
(52) U.S. Cl. ............................................. 95/29; 96/389
(58) Field of Classification Search ............... 55/292; 95/29; 96/389; 422/20
See application file for complete search history.

(56) References Cited

U.S. PATENT DOCUMENTS

| | | | |
|---|---|---|---|
| 3,109,721 A * | 11/1963 | Zenner et al. | ........................ 95/29 |
| 3,693,327 A | 9/1972 | Scheinberg | |
| 5,299,175 A * | 3/1994 | Gallego-Juarez et al. | .... 367/138 |
| 5,392,635 A * | 2/1995 | Cadet et al. | ................... 73/24.01 |
| 5,449,535 A | 9/1995 | Streater | |
| 6,166,383 A | 12/2000 | Kimmig et al. | |
| 6,467,350 B1 | 10/2002 | Kaduchak et al. | |
| 6,644,118 B2 | 11/2003 | Kaduchak et al. | |
| 6,665,326 B2 * | 12/2003 | Kusunose | ........................ 372/57 |
| 6,733,569 B2 * | 5/2004 | Geller et al. | ........................ 95/29 |
| 6,749,666 B2 * | 6/2004 | Meegan, Jr. | ........................ 95/29 |
| 6,797,158 B2 * | 9/2004 | Feke et al. | ........................ 210/97 |
| 2002/0162393 A1 * | 11/2002 | Kaduchak et al. | ............ 73/570.5 |
| 2003/0015035 A1 | 1/2003 | Kaduchak et al. | |
| 2007/0241280 A1 * | 10/2007 | Dainobu et al. | ............... 250/343 |

OTHER PUBLICATIONS

Shulim Kogan et al., "Acoustic Concentration of Particles in Piezoelectric Tubes: Theoretical Modeling of the Effect of Cavity Shape and Symmetry Breaking," J. Acoust. Soc. Am. 116 (4) Pt. 1, (2004), 1967-1974.
Rudolf Tuckermann et al., "Trapping of Heavy Gases in Stationary Ultrasonic Fields," Chem. Phys. Letts. 363 (2002) 349-354.
G. Nienhuis, "Adsorption Effects in Light-Induced Drift," Optics Communications, vol. 62, No. 2, (1987), 81-85.
International Search Report for PCT/US09/57903, International Searching Authority, Nov. 19, 2009, pp. 1-9.

* cited by examiner

*Primary Examiner* — Duane Smith
*Assistant Examiner* — Sonji Turner
(74) *Attorney, Agent, or Firm* — Samuel M. Freund; Cochran Freund & Young LLC

(57) ABSTRACT

An apparatus and method for separating a chosen gas from a mixture of gases having no moving parts and utilizing no chemical processing is described. The separation of particulates from fluid carriers thereof has been observed using ultrasound. In a similar manner, molecular species may be separated from carrier species. It is also known that light-induced drift may separate light-absorbing species from carrier species. Therefore, the combination of temporally pulsed absorption of light with ultrasonic concentration is expected to significantly increase the efficiency of separation by ultrasonic concentration alone. Additionally, breaking the spatial symmetry of a cylindrical acoustic concentrator decreases the spatial distribution of the concentrated particles, and increases the concentration efficiency.

17 Claims, 2 Drawing Sheets

GAS SEPARATION USING ULTRASOUND AND LIGHT ABSORPTION

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to gas separation and, more particularly, to the separation of a chosen gas from a gas mixture using ultrasonic concentration in cooperation with light absorption.

BACKGROUND OF THE INVENTION

Carbon dioxide sequestration and removing $CO_2$ from the atmosphere or from gaseous effluents produced by electric power generation or other industrial activity, as examples, have become major environmental issues relating to global warming. Currently, membrane technology and chemistry related carbon dioxide removal processes are in use; however, the chemical systems used generate their own environmental issues.

The development of an efficient process for carbon dioxide removal from a gas mixture containing this molecule without the use of chemicals or other disposables would provide a method for controlling or reducing greenhouse gas emission, and assist in the process of sequestration of carbon dioxide. A similar problem exists for removing carbon monoxide from fuel cells, thereby reducing the carbon monoxide poisoning problem therein.

In a continuous medium (e.g., gas), sound is propagated as a wave from the source. The sound waves are transmitted by alternating compressions and rarefactions in adjacent gas layers. In a real fluid, sound is conducted by establishing an oscillating motion of discrete neighboring gas atoms and/or molecules and the gas is regarded as a continuum. The variations of gas density due to pressure changes in the gas layers induce an organized vibratory motion of the gas molecules. Therefore, fluctuations in sound pressure cause gas-borne particles to vibrate and possibly to collide. If the sound wave is contained in a resonant cavity and the frequency of the sound is such that standing waves of sound are established in the gas inside the cavity, one observes the establishment of pressure nodes and antinodes. Consequently, there are pressure gradients in the cavity that generate an acoustic radiation force that acts on air-borne particles (e.g., aerosols) and push these particles to the nodes or the antinodes depending on their size. This is the basis of the acoustic concentration of particles in acoustic standing wave.

U.S. Pat. No. 6,467,350 for "Cylindrical Acoustic Levitator/Concentrator" which issued to Gregory Kaduchak and Dipen N. Sinha on Oct. 22, 2002, describes a low-power, acoustic apparatus for concentrating aerosols and small liquid/solid samples having particulates up to several millimeters in diameter. A commercially available, hollow cylindrical piezoelectric crystal which has been modified to tune the resonance frequency of the breathing mode resonance of the crystal to that of the interior cavity of the cylinder is used to establish a standing-wave pattern in the cavity which is effective for concentrating aerosol particles in air. Tuning the resonance frequency of the cylinder may be accomplished by removing an axial slice from the cylinder wall, choosing the composition of the piezoelectric cylinder, and by inserting a rod having appropriate dimensions into the cylinder, as examples. Accurate alignment of the resonant cavity is not required. Aerosol particles are directed to the resonance nodes that are in the form of rings; however, this makes actual collection of the aerosol particles difficult.

U.S. Pat. No. 6,644,118 for "Cylindrical Acoustic Levitator/Concentrator Having Non-Circular Cross-Section," which issued to Gregory Kaduchak and Dipen N. Sinha on Nov. 11, 2003, describes the deformation of the circular cross-section of the transducer to concentrate the acoustic force along axial regions parallel to the axis of the transducer in order to obviate the need for a free-standing insert along the central axis of the cylinder to achieve this purpose, while causing particles in the fluid to concentrate within the regions of acoustic force for separation from a carrier fluid. In "Acoustic Concentration Of Particles In Piezoelectric Tubes: Theoretical Modeling Of The Effect Of Cavity Shape And Symmetry Breaking" by Shulim Kogan et al., J. Acoust. Soc. Am. 116 (2004) 1967-1974, provides a theoretical analysis of how the breaking of the spatial symmetry in cylindrical acoustic concentrators decreases the spatial distribution of the concentrated particles, thereby increasing the concentration efficiency and results in a simplification of the particle collection apparatus. The modified cavity is slightly elliptical in shape, which allows the nodal (and antinodal) rings to collapse into points. In the case of a generally cylindrical geometry with an elliptical cross-section, one can generate several lines parallel to the axis of the cylinder that represent the nodes where the aerosol particles collect. This makes the collection of the concentrated particles simpler. A few collection tubes may be placed at the appropriate locations near the end of the cylindrical cavity. It should be pointed out that the piezoelectric tube does not need to be elliptical in cross-section. Rather, the air cavity may be made elliptical by inserting two solid inserts having suitable curvature on each side on diagonally opposite ends of the circular cross-section of the piezoelectric tube that make good physical contact with the inner surface of thereof.

In "Trapping Of Heavy Gases In Stationary Ultrasonic Fields" by Rudolf Tuckermann et al., Chem. Phys. Letts. 363 (2002) 349-354, gases, such as $CO_2$, were found to gather in stable rotational ellipsoidal systems around the pressure nodes of a stationary ultrasonic field. The authors state that: "With decreasing mass density of the sample gas the effect is reduced and totally disappears when sample gases with a lower mass density than the host medium are used . . . , there is strong evidence that the difference in mass density but not in temperature of the sample gas and the host medium are governing to effect.", and "Assuming two nonmiscible fluids with different speeds of sound and with a plain common phase boundary a vertically propagating ultrasonic wave pushes the fluid with the lower speed of sound through the boundary layer into the other fluid independently of the direction of the wave. Transforming this example to two gases with different densities in a SUSF (stationary ultrasonic field) one can expect a similar result: according to Eq. (7), the gas with the higher mass density has a lower speed of sound and is sucked into the SUSF, then displaces the gas with the lower mass density and forms zones of trapped gas."

In "Adsorption Effects In Light-Induced Drift" by G. Nienhuis, Optics Communications 62 (15 Apr. 1987) 81-85, light-induced drift resulting from excitation of optically active atoms immersed in a buffer gas is described. The effect arises from a difference in thermalization rate of the velocity distribution for both states of the atoms, due to different cross sections for elastic collisions with buffer-gas particles. For steady state conditions, a flow of excited atoms is not counterbalanced by an opposite flow of ground-state atoms, and a net flow of atoms remains leading to a density gradient in a closed cell. That is, light passing through an optically thick medium can move the atoms towards the dark end of the cell while leaving the buffer-gas particles untouched.

SUMMARY OF THE INVENTION

Accordingly, it is an object of the present invention to provide an apparatus and method for separating a chosen gas from a gas mixture.

Another object of the invention is to provide an apparatus and method for separating carbon dioxide from a gas mixture containing this gas.

Still another object of the invention is to provide an apparatus and method for separating carbon dioxide from a gas mixture containing this gas, without the use of chemicals or other disposables.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for separating a chosen gas species contained in a gas mixture, hereof, includes in combination: a cylindrical piezoelectric transducer defining an interior cavity having a surface defining an axis, wherein the interior cavity has an acoustic resonance that is matched to a breathing-mode acoustic resonance of the cylindrical piezoelectric transducer when the interior cavity is filled with the gas mixture; a function generator connected to apply periodic electrical excitation to the cylindrical piezoelectric transducer such that resonant acoustic waves are generated in the interior cavity and form regions of concentrated acoustic force, wherein the interior cavity surface is reshaped from a circular cross-section such that the regions of concentrated acoustic force are axial regions parallel to the axis of the interior cavity surface; input means for introducing the gas mixture containing the chosen gas species into the vicinity of the regions of concentrated acoustic force formed by the resonant acoustic waves such that the chosen gas species move through the regions of concentrated acoustic force and are concentrated therein; a source of light having a selected wavelength absorbed by the chosen gas species, the light therefrom being directed parallel to the axis; and means for pulsing on said source of light during selected intervals within successive one-half periods of the acoustic excitation, wherein light-induced drift is generated in the absorbing chosen gas species.

In another aspect of the invention, and in accordance with its objects and purposes, the method for concentrating a chosen gas species contained in a gas mixture, hereof, includes the steps of: providing a cylindrical piezoelectric transducer having a surface defining an interior cylindrical cavity having a surface defining an axis and having a resonance frequency matched to the breathing mode frequency of the transducer; reshaping the interior cylindrical cavity surface from a circular cross-section; applying periodic electrical excitation to the cylindrical piezoelectric transducer such that resonant acoustic waves are generated within the interior cylindrical cavity to form localized force concentration regions of acoustic force parallel to the axis of the cavity surface; subjecting the gas mixture containing the chosen gas species to the localized force concentration regions such that the chosen gas species move to the localized force concentration regions and are concentrated thereby; directing light having a selected wavelength absorbed by the chosen gas species parallel to the axis; and pulsing the light on during selected intervals within successive one-half periods of the electrical excitation, wherein light-induced drift is generated in the absorbing chosen gas species.

Benefits and advantages of the present invention include, but are not limited to, providing an apparatus and method for separating infrared radiation-absorbing molecules from a mixture of gases containing such molecules without the use of chemicals or other disposables.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Briefly, the present invention includes an apparatus and method for separating a chosen gas from a mixture of gases having no moving parts and utilizing no chemical processing. As stated hereinabove, the separation of particulates from fluid carriers thereof has been observed using ultrasound. Heavier molecular species may be similarly separated from lighter carrier species. Further, as stated hereinabove, light-induced drift may separate light-absorbing species from carrier species. Therefore, the combination of light absorption with ultrasonic separation is expected to significantly increase the efficiency of separation by ultrasonic concentration alone. Additionally, breaking the spatial symmetry of a cylindrical acoustic concentrator decreases the spatial distribution of the concentrated particles, and increases the concentration efficiency.

An acoustic wave in a gas is a pressure wave. Compression and rarefaction of a gas causes its temperature to vary. The generation of density and pressure gradients in the wave results in the diffusion of the gas components within each wavelength of the pressure wave. Likewise, the temperature gradients result in the heat transfer which is accompanied by thermodiffusion (diffusion of gas molecules under temperature gradient). These processes are irreversible (the entropy of the gas grows) and result in the attenuation of the acoustic wave. However, the rate of diffusion of different components is different which ultimately, but slowly, results in the separation of mixture's components; that is, the concentration of each component differs from the concentration of this component in an equilibrium gas in the absence of the acoustic wave. At the time and place where the concentration of one component is maximal (enrichment) the concentration of other component is minimal (depletion). The separation of the components alternates in time with the frequency of the acoustic wave and further alternates in space (in a non-steady, propagating wave). If this process is carried out inside an acoustic resonant cavity, the heavier gas will slowly separate from the mixture and collect at the nodes as is the case for aerosols as described by Tuckermann et al., supra.

It is believed by the present inventor, that the reason that the process of Tuckerman et al. is inefficient is that the gases separate during one-half cycle of a sound wave, but much of the gas mixes during the other half-cycle since the effect of the ultrasonic rarefaction and compression sound (pressure) wave on the molecules is approximately symmetrical.

The light-induced drift (LID) effect occurs when a laser beam passes through a closed cell containing a rarefied gas, one component of which consists of excitable gas molecules and the laser is tuned to excite molecules in a chosen velocity interval. Therefore, the excited molecules have a nonzero preferential velocity. The interaction properties of excited-state and ground-state molecules with other buffer particles in the bulk of the gas and/or with the cell walls, usually modeled in LID theory by bulk and surface "accommodation coefficients," may be different, in which case LID may manifest itself by an initial drift of molecules, one way or the other, parallel to the laser beam. The effect arises from a difference in thermalization rate of the velocity distribution for both states of the atoms, due to different cross sections for elastic collisions with buffer-gas particles. Because the gas cell is closed, molecules cannot drift in steady state, and a partial pressure difference builds up across the gas cell. For an optically thick system, where the intensity of the light passing through the medium can display a strong variation in the propagation direction, this density gradient can become significant. The light effectively directs the excited atoms towards the dark end of the cell, while leaving the buffer-gas particles untouched.

A combination of LID with acoustic resonance separation might be expected to enhance the gas separation process where a gas (heavier than the carrier gas) that is to be separated is excited with the appropriate wavelength of radiation. As stated hereinabove, if a gas mixture is subjected to sound waves then, depending on the cycle of the sound wave, the gas mixture tends to mix or separate, and separate or mix, respectively, during the next cycle, with the net gain in terms of separation being slow. As will be described hereinbelow, by artificially making the process asymmetric, the separation process is expected to become significantly more effective.

A single, isolated gas bubble at rest in an incompressible liquid that is either saturated or unsaturated with gas is not in chemical equilibrium and, in the absence of a sound field, it would gradually dissolve and disappear as gas diffuses from the bubble to the surrounding liquid. However, pulsations of the bubble caused by a sound field may cause diffusion of gas into the bubble by a process called "rectified diffusion." This process competes with the normal static diffusion of gas out of the bubble, and may counterbalance the static diffusion if the acoustic-pressure amplitude is greater than some threshold value. A qualitative understanding of rectified diffusion may be obtained by considering three effects of the oscillations of a bubble. First, when the bubble contracts the gas density in the bubble increases and gas diffuses out of the bubble. Further, when the bubble expands, the gas density decreases and gas tends to diffuse into the bubble. The second effect arises from the change in area of the bubble wall. Because this area is greater during expansion, more gas will enter during the expansion than will leave during the contraction of the bubble. Therefore, there will be a net increase in the amount of gas in the bubble. The third effect is a spherical "shell" effect. At any moment, the rate of diffusion of gas in the liquid is proportional to the gradient of the concentration of dissolved gas. When the bubble contracts, the thickness of a spherical shell of liquid surrounding the bubble increases. The concentration gradient in the liquid is thereby reduced, and the rate of diffusion of gas away from the bubble wall decreases. When the bubble expands, this concentration gradient is increased and the rate of diffusion of gas toward the bubble increases. The net effect is to increase the rectified diffusion. The shell effect depends on the spherical geometry and would not be present in a one-dimensional situation such as that of a piston pushing on a column of liquid. The effect is due to the radial motion of an incompressible liquid, and the term "shell effect" refers specifically to this alternate squeezing and expanding of a spherical shell.

A further enhancement in the separation of gases then may be possible by timing the optical excitation process such that it is asymmetric in relationship to the acoustic excitation. As an example, the gas component of the mixture to be separated is excited by an appropriate wavelength of light only during each rarefaction cycle of the sound wave. The effectiveness of this can be understood by analogizing the rectified diffusion process in the cavitation of bubbles in liquids subjected to high intensity sound. In this situation, the process of bubble growth and bubble contraction are asymmetric during the rarefaction and the compression cycles of the sound wave. The bubble growth is slightly larger than the contraction during each cycle leading to the bubble growing to a large size quickly in a sound field as this process is repeated thousands of times a second. Similarly, if the gas mixture is subjected to sound waves during each cycle of sound, the gas mixture tends to both mix and separate with the net gain in terms of separation being small. By making the process asymmetric, the separation process can be significantly enhanced.

It is believed by the present inventor that a rectified diffusion process similar to that observed for bubble growth in acoustic cavitation where a microscopic bubble, once generated in an oscillating pressure field grows larger instead of remaining stable, will result in efficient separation of gases in a mixture thereof using an ultrasonic concentrator in combination with light-induced drift. Therefore, a combination of timed spectroscopic excitation with stationary acoustic concentration is expected to enhance the gas separation process where a gas (heavier than the carrier gas) that is to be separated is excited with the appropriate wavelength of radiation, if the infrared radiation is applied only during alternating half-cycles of the acoustic field. This renders the separation process nonlinear, and the separation may then efficiently proceed in one direction.

More particularly, the apparatus described in U.S. Pat. Nos. 6,644,118 and 6,467,350, supra, the disclosures of which are hereby incorporated herein for all that they teach, may be improved by a light source (an infrared laser source in the case of the separation of $CO_2$ or of CO from air), that may be directed into a slightly elliptical, approximately cylindrical piezoelectric concentrator using mirrors or other well-known means to guide light, thereby exposing the gases contained in the concentrator to this radiation. The gas mixture may enter one side of the cylinder and exit from the other end thereof, in the region of which end small diameter tubes may be disposed to exhaust gases having increased $CO_2$ concentration. An automatic electronic feedback system may be employed for optimizing the acoustic frequency of the concentrator since the sound speed in the gases to be processed will vary with the temperature, thereby affecting the standing waves generated in the concentrator. This feedback system dynamically shifts the applied electric signal to the piezoelectric tube such that the cavity resonance condition is always maintained regardless of temperature variation or flow rate variation. This type of system is common and is based on phase-locked loop electronics and can be established in several ways.

Figure 1:
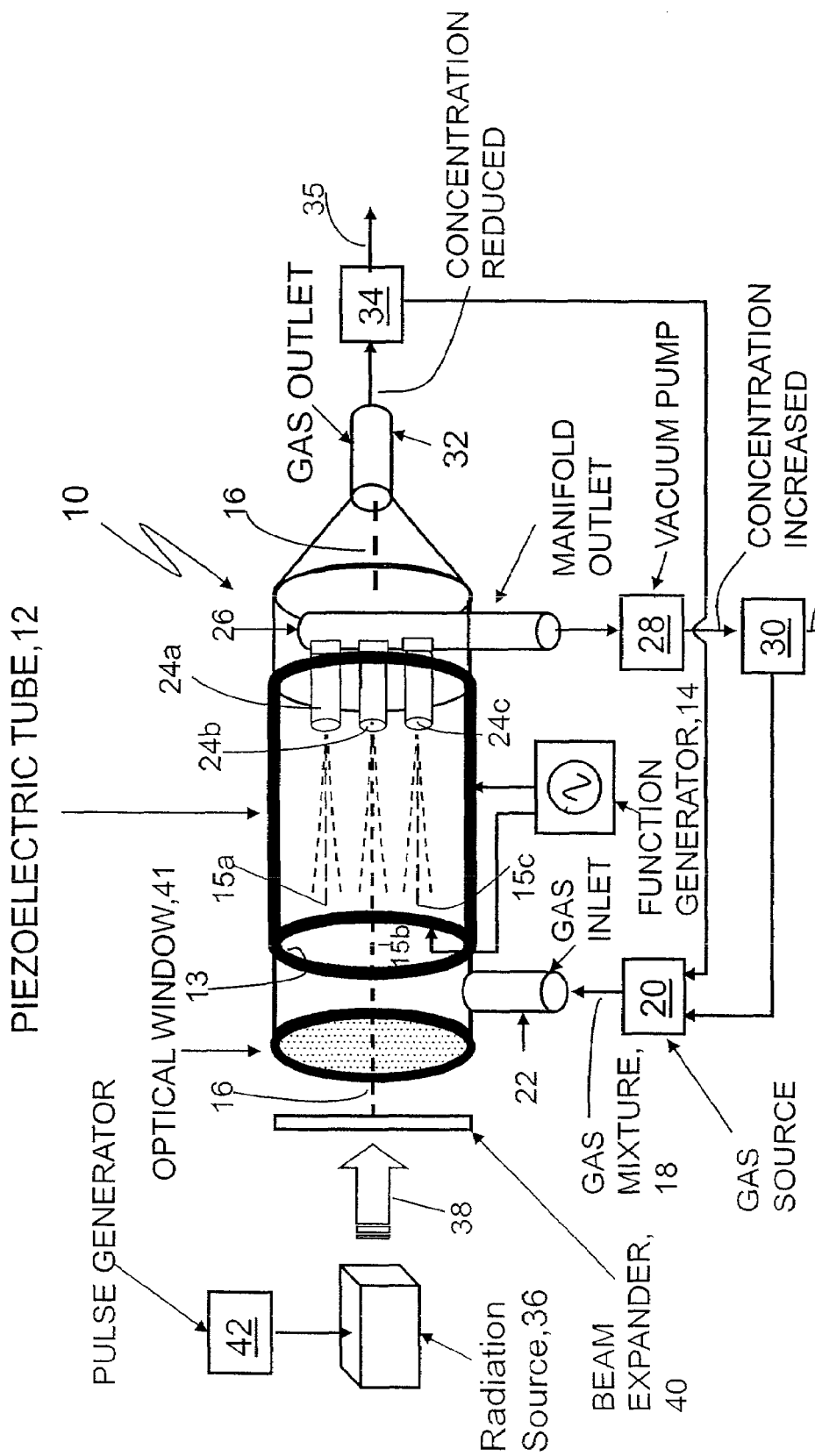
FIG. 1 is a schematic representation of one embodiment of an apparatus for separating a chosen, light-absorbing gas from a gas mixture, wherein pulsed radiation having an effective wavelength is introduced into an ultrasonic concentrator along the direction of flow of the gas mixture.

Reference will now be made in detail to the present embodiments of the invention, examples of which are illustrated in the accompanying drawings. In the Figures, similar structure will be identified using identical reference characters. Turning now to FIG. 1, shown is a schematic representation of one embodiment of apparatus, 10, for separating a chosen, light-absorbing gas from a gas mixture. Hollow, cylindrical piezoelectric transducer, 12, having interior cavity, 13, slightly reshaped to be elliptical in cross-section, and powered by function generator, 14, may be operated in accordance with the principles of U.S. Pat. Nos. 6,467,350 and 6,644,118, supra. An acoustic excitation range between 10 kHz and 100 kHz is expected to be effective. Transducer 12 may be slightly elliptical in cross section, wherein the interior cavity is an oblate cylinder having a ratio of a minor axis to a major axis that is slightly less than unity (See, e.g., U.S. Pat. No. 6,644,118), thereby concentrating the acoustic force along axial regions, 15a-15c, parallel to axis, 16, of transducer 12. As mentioned hereinabove, the elliptical cross-section may also be created using solid inserts inside the circular piezoelectric tube. Gas mixture, 18, from gas source, 20, contains the gas species to be separated from the mixture, and is introduced into transducer 12 through gas inlet port, 22. Intake tubes, 24a-24c, receive the gas containing the radiation-absorbing gas to be concentrated since each of these tubes lies along one of the axial regions 15a-15c, respectively. Manifold, 26, evacuated by vacuum pump, 28, directs the gas mixture concentrated in the radiation-absorbing species to collection vessel, 30, which can be used to replenish gas source 20 for another cycle through piezoelectric concentrator 12 if the concentration of the radiation-absorbing gas is to be increased. Gas from collection vessel 30 may be directed, 31, to the inlet of other gas separation apparatus similar to apparatus 10 hereof (not shown in FIG. 1) for further concentration of the radiation-absorbing gas. Gas depleted of the radiation-absorbing species exits tube 12 through port, 32, and is collected in collection vessel, 34, can be used to replenish gas source 20 if further reduction in concentration of the radiation-absorbing species is desired, can be directed, 35, to the inlet of other gas separation apparatus similar to apparatus 10, hereof (not shown in FIG. 1), for further reduction of the radiation-absorbing gas, and/or released to the ambient air. It is anticipated that multiple such units will be employed.

Radiation source, 36, generates intense electromagnetic radiation, 38, having a chosen wavelength selected such that it is absorbed by the gas species to be separated from the gas mixture, and that the light-induced deflection is large. Beam expander, 40, permits the radiation to fill the interior of the piezoelectric concentrator 12, after passing through window, 41, effective for transmitting the chosen wavelength and for providing a gas seal for piezoelectric tube 12. The radiation source may be a laser, or a light-emitting diode, as examples. As stated hereinabove, in order for the light-induced drift to improve the separation of gases in an ultrasonic concentrator, it must be asymmetrically applied. Pulse generator, 42, pulses light source 36 for specific intervals at specific times.

It is anticipated that the present invention may be used to reduce radiation-absorbing target species in a gas mixture to trace levels thereof.

Having generally described the invention, the following EXAMPLE provides additional details:

EXAMPLE

For carbon dioxide, infrared radiation having wavelengths of 2.7, 4.3 and 15 microns is efficiently selectively absorbed (approximately 98%), while the other components in the entraining air do not absorb at these wavelengths. The absorbing molecules transfer energy to the surrounding molecules and atoms of the carrier fluid, with consequent increase in the local kinetic energy, thereby increasing the rate of diffusion of the absorbing $CO_2$ molecules. This process has been observed at very low concentrations of $CO_2$ using the photoacoustic effect.

Figure 2:
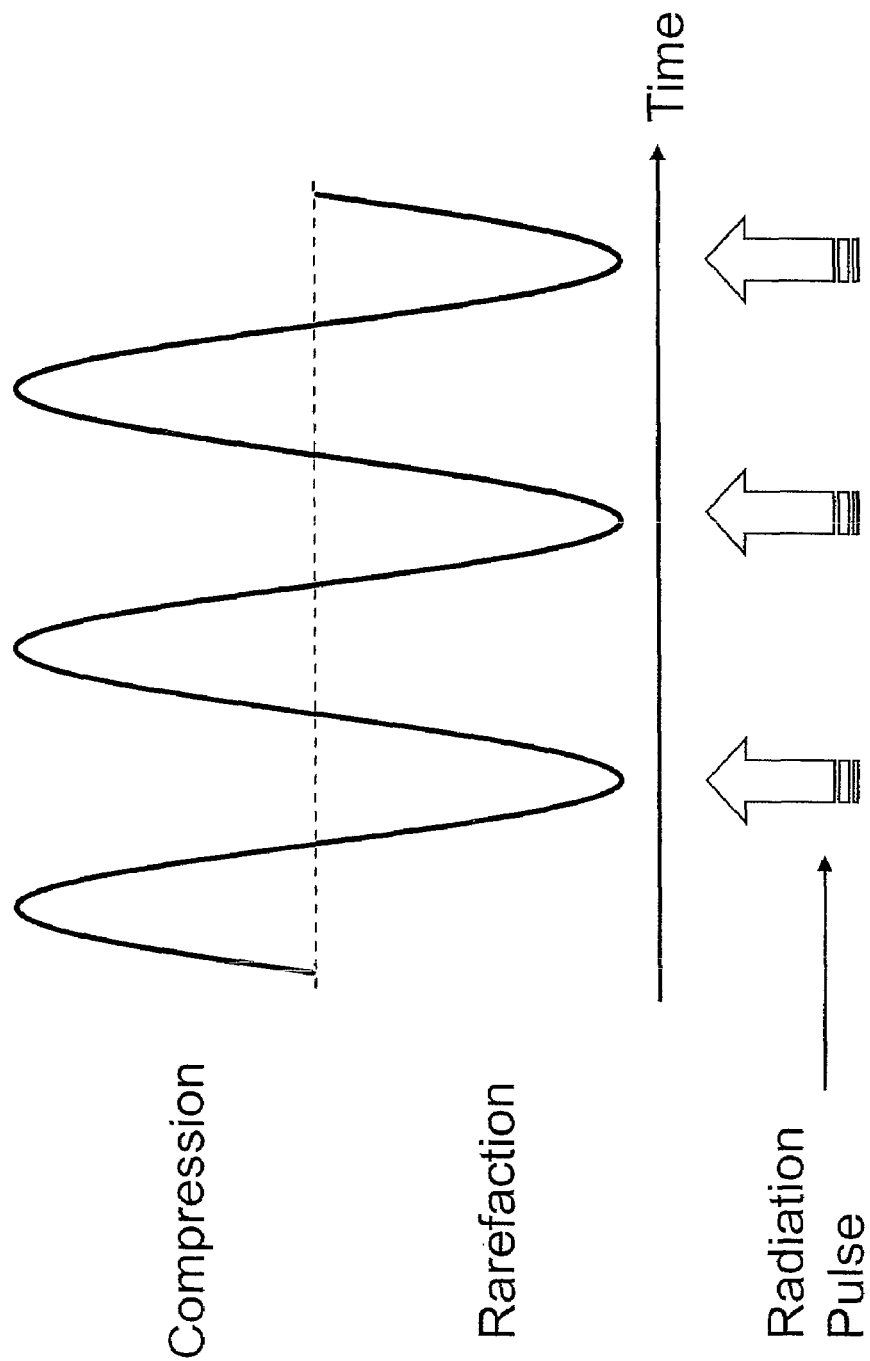
FIG. 2 is a graph showing the timing of the pulsed radiation as a function of time as displayed by the wavelength of the applied ultrasonic signal.

FIG. 2 is a graph showing the timing of the pulsed infrared radiation versus the wavelength of the applied ultrasonic signal. It may be observed that the radiation pulse is applied asymmetrically; that is, either during the compression portion of the sound wave or during the rarefaction portion thereof.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for separating a chosen gas species contained in a gas mixture, which comprises in combination:
   a cylindrical piezoelectric transducer defining an interior cavity having a surface defining an axis, wherein the interior cavity has an acoustic resonance that is matched to a breathing-mode acoustic resonance of the cylindrical piezoelectric transducer when the interior cavity is filled with the gas mixture;
   a function generator connected to apply periodic electrical excitation to the cylindrical piezoelectric transducer such that resonant acoustic waves having successive one-half periods of acoustic compression and successive one-half periods of acoustic rarefaction are generated in the interior cavity and form regions of concentrated acoustic force, wherein the interior cavity surface is reshaped from a circular cross-section such that the regions of concentrated acoustic force are axial regions parallel to the axis of the interior cavity surface;
   input means for introducing the gas mixture containing the chosen species into the vicinity of the regions of concentrated acoustic force formed by the resonant acoustic waves such that the chosen gas species move through the regions of concentrated acoustic force and are concentrated therein;
   a source of light having a selected wavelength absorbed by the chosen gas species, the light therefrom being directed parallel to the axis; and
   means for pulsing on said source of light during selected intervals within the successive one-half periods of acoustic compression and off during selected intervals within the successive one-half periods of acoustic rarefaction, or pulsing on said source of light during selected intervals within the successive one-half periods of acoustic rarefaction and off during selected intervals within the successive one-half periods of acoustic compression, wherein light-induced drift is generated in the absorbing chosen gas species.

2. The apparatus as described in claim 1, wherein deformed interior cavity is an oblate cylinder having a ratio of a minor axis to a major axis that is slightly less than unity.

3. The apparatus as described in claim 1, further comprising means for flowing the gas mixture containing the chosen gas species through the cylindrical piezoelectric transducer.

4. The apparatus as described in claim 1, further comprising means for collecting the gas mixture containing chosen species that have moved through the regions of concentrated acoustic force and are concentrated therein.

5. The apparatus as described in claim 1, wherein said source of light comprises a source of infrared light.

6. The apparatus as described in claim 5, wherein the chosen gas species comprises carbon dioxide.

7. The apparatus as described in claim 5, wherein the chosen gas species comprises carbon monoxide.

8. The apparatus as described in claim 1, wherein the light from said light source fills the interior cavity of said piezoelectric transducer.

9. A method for concentrating a chosen gas species contained in a gas mixture, which comprises the steps of:
   providing a cylindrical piezoelectric transducer having a surface defining an interior cylindrical cavity having a surface defining an axis and having a resonance frequency matched to the breathing mode frequency of the transducer;
   reshaping the interior cylindrical cavity surface from a circular cross-section;
   applying periodic electrical excitation to the cylindrical piezoelectric transducer such that resonant acoustic waves having successive one-half periods of acoustic compression and successive one-half periods of acoustic rarefaction are generated within the interior cylindrical cavity to form localized force concentration regions of acoustic force parallel to the axis of the cavity surface;
   subjecting the gas mixture containing the chosen species to the localized force concentration regions such that the chosen gas species move to the localized force concentration regions and are concentrated thereby;
   directing light having a selected wavelength absorbed by the chosen gas species parallel to the axis; and
   pulsing the light on during selected intervals within the successive one-half periods of acoustic compression and off during selected intervals within the successive one-half periods of acoustic rarefaction or pulsing the light on during selected intervals within the successive one-half periods of acoustic rarefaction and off during selected intervals within the successive one-half periods of acoustic compression, wherein light-induced drift is generated in the absorbing chosen gas species.

10. The method as described in claim 9, wherein said step of deforming the interior cavity comprises forming an oblate cylinder having a ratio of a minor axis to a major axis that is slightly less than unity.

11. The method as described in claim 9, wherein the ratio of the minor axis to the major axis is between about 0.8 and about 0.99.

12. The method as described in claim 9, further comprising the step of flowing the gas mixture containing the chosen gas species through the cylindrical piezoelectric transducer.

13. The method as described in claim 9, further comprising the step of collecting the gas mixture containing chosen species that have moved through the regions of concentrated acoustic force and are concentrated therein.

14. The method as described in claim 9, wherein the light comprises infrared light.

15. The method as described in claim 14, wherein the chosen gas species comprises carbon dioxide.

16. The method as described in claim 14, wherein the chosen gas species comprises carbon monoxide.

17. The method as described in claim 9, wherein the light from said light source fills the interior cavity of the piezoelectric transducer.

* * * * *